(12) United States Patent
Orii et al.

(10) Patent No.: US 11,885,403 B2
(45) Date of Patent: Jan. 30, 2024

(54) LUBRICANT SEALING STRUCTURE, STRAIN WAVE GEARING, AND ACTUATOR

(71) Applicant: HARMONIC DRIVE SYSTEMS INC., Tokyo (JP)

(72) Inventors: Daisuke Orii, Azumino (JP); Syuhei Kobayashi, Azumino (JP)

(73) Assignee: HARMONIC DRIVE SYSTEMS INC., Tokyo (JP)

( * ) Notice: Subject to any disclaimer, the term of this patent is extended or adjusted under 35 U.S.C. 154(b) by 0 days.

(21) Appl. No.: 17/759,290

(22) PCT Filed: Apr. 10, 2020

(86) PCT No.: PCT/JP2020/016208
§ 371 (c)(1),
(2) Date: Jul. 22, 2022

(87) PCT Pub. No.: WO2021/205666
PCT Pub. Date: Oct. 14, 2021

(65) Prior Publication Data
US 2023/0093559 A1    Mar. 23, 2023

(51) Int. Cl.
*F16H 57/029* (2012.01)
*F16H 49/00* (2006.01)
*F16H 57/04* (2010.01)

(52) U.S. Cl.
CPC ......... *F16H 57/029* (2013.01); *F16H 49/001* (2013.01); *F16H 57/048* (2013.01); *F16H 57/0427* (2013.01)

(58) Field of Classification Search
CPC .................. F16H 49/001; F16J 15/3424; F16J 15/153428
See application file for complete search history.

(56) References Cited

U.S. PATENT DOCUMENTS 3,703,296 A * 11/1972 Malmstrom ......... F16J 15/3456
                                                          277/408
5,984,048 A * 11/1999 Kiyosawa ............. F16H 49/001
                                                          184/6.12
(Continued)

FOREIGN PATENT DOCUMENTS

JP    H09250611 A    9/1997
JP    H10331985 A    12/1998
(Continued)

OTHER PUBLICATIONS

International Search Report (PCT/ISA/210) with English translation and Written Opinion (PCT/ISA/237) dated Jun. 2, 2020, by the Japanese Patent Office as the International Searching Authority for International Application No. PCT/JP2020/016208.

*Primary Examiner* — Thomas C Diaz
(74) *Attorney, Agent, or Firm* — BUCHANAN INGERSOLL & ROONEY PC

(57) ABSTRACT

A strain wave gearing has a lubricant sealing structure that prevents a lubricant from leaking to the outside through a gap portion between a hollow input shaft and an end plate. The lubricant sealing structure includes an oil-repellent surface formed on the surface portion facing the gap portion, an oil seal that seals the gap portion, and an oil film forming surface formed at a lip tip surface of the oil seal. The oil-repellent surface has a surface texture in which first fine grooves are formed in a predetermined pattern so that an oil-repellent effect can be obtained with respect to the lubricant. The oil film forming surface has a surface texture in which second fine grooves are formed in a predetermined pattern so that an oil film forming effect of a seal lip grease can be obtained.

6 Claims, 5 Drawing Sheets

(56) References Cited

U.S. PATENT DOCUMENTS

| | | | |
|---|---|---|---|
| 6,170,834 B1 | 1/2001 | Vogt | |
| 8,991,282 B2 * | 3/2015 | Yajima | F16H 49/001 74/640 |
| 9,644,727 B2 * | 5/2017 | Yajima | H02K 7/116 |
| 10,823,278 B2 * | 11/2020 | Tezuka | F16H 1/32 |
| 2008/0088094 A1 * | 4/2008 | Borowski | F16C 33/74 277/559 |

FOREIGN PATENT DOCUMENTS

| | | |
|---|---|---|
| JP | 2006258234 A | 9/2006 |
| JP | 2008223868 A | 9/2008 |
| JP | 2010180971 A | 8/2010 |
| JP | 5465109 B2 | 1/2014 |
| JP | 2017214996 A | 12/2017 |
| WO | 2013121812 A1 | 8/2013 |
| WO | 2018189798 A1 | 10/2018 |

* cited by examiner

LUBRICANT SEALING STRUCTURE, STRAIN WAVE GEARING, AND ACTUATOR

TECHNICAL FIELD

The present invention relates to a lubricant sealing structure used in a strain wave gearing, in an actuator that is provided with a strain wave gearing and a motor, and in other mechanical devices. More specifically, the present invention relates to a lubricant sealing structure that prevents a lubricant from leaking out from the interior of a device to the exterior through a space between a first member and a second member that rotate relative to one another about a central axis.

BACKGROUND ART

In strain wave gearings and other gearing devices, a rotating member such as an input shaft or an output shaft is disposed in a secured-side device housing with a gap interposed therebetween. Typically, an oil seal is used in order to prevent a lubricant such as oil or grease with which the interior of the device is filled from leaking outside of the device or to other sites within the device through the gap. The oil seal is provided with an annular seal element composed of an elastic material, the seal element being secured to the device housing, and a seal lip of the seal element being slidably pressed against the outer peripheral surface of the rotating member, whereby the gap is sealed such that the lubricant does not leak out.

Patent literature 1 (JP 2006-258234 A) proposes a lubricant hermetic-sealing device in which the sealing properties of an oil seal are enhanced. In this lubricant hermetic-sealing device, a fluorine-based grease having oil repellency with respect to a lubricant is applied to portions of a rotating member that are sealed by an oil seal, and the sealing properties are enhanced.

Moreover, surface texturing, in which fine grooves, etc., are machined into a designated surface, is known as a technique for modifying surfaces such as sliding surfaces. Patent Literature 2 (JP 2017-214996 A) proposes forming a periodic structure of recesses and protrusions in the form of a fine grating in a sliding surface, and preventing any increase in friction and any occurrence of burning caused by a deficiency of lubricant, through surface machining in which a femtosecond laser is used. Additionally, Patent Literature 3 (JP 5465109 B) proposes interposing a lubricating fluid onto sliding surfaces between two members and forming very small grooves in the sliding surfaces through laser machining, thereby imparting a strong friction-reducing effect.

PRIOR-ART LITERATURE

Patent Literature

Patent Literature 1: JP 2006-258234 A
Patent Literature 2: JP 2017-214996 A
Patent Literature 3: JP 5465109 B

SUMMARY OF THE INVENTION

Problems to be Solved by the Invention

In order to maintain the sealing properties of an oil seal, it is necessary for a seal-lip grease film to be kept at a suitable thickness on a portion to be sealed using a seal lip, and for wear in the seal portion to be prevented. If a lubricant such as gear oil that is enclosed in the interior of a device penetrates and comes into contact with the seal portion, there is a concern that the wear resistance and sealing properties of the seal portion could decrease.

It is an object of the present invention to provide a lubricant sealing structure with which it is possible to maintain the sealing properties of an oil seal using fine groove machining (surface texturing).

Means of Solving the Problems

The present invention provides a lubricant sealing structure that prevents a lubricant from leaking out, from the interior of a device provided with a first member and a second member that rotate relative to one another about a central axis, through a gap portion between the first and second members.

The lubricant sealing structure according to the present invention is provided with:

a first surface portion of the first member and a second surface portion of the second member, between which the gap portion is formed;

an oil seal that is secured to the first surface portion and that seals the gap portion while slidably being in contact with the second surface portion;

an oil-repellent surface that is formed on at least one of the first surface portion and the second surface portion, and that is positioned at a side of the interior of the device with respect to the oil seal; and an oil film formation surface formed on at least one of a distal-end surface portion of the oil seal that comes into contact with the second surface portion and a site on the second surface portion with which the distal-end surface portion comes into contact, the oil-repellent surface being provided with a surface texture in which first fine grooves are formed in a prescribed pattern so as to achieve an oil-repelling effect with respect to the lubricant, the first fine grooves being provided with a groove width and a groove depth ranging from several microns to several tens of nanometers, and being formed in the oil-repellent surface at intervals ranging from several microns to several tens of nanometers, the oil film formation surface being provided with a surface texture in which second fine grooves are formed in a prescribed pattern so as to achieve an oil film formation effect, and the second fine grooves being provided with a groove width and a groove depth ranging from several microns to several tens of nanometers, and being formed in the oil film formation surface at intervals ranging from several microns to several tens of nanometers.

In the lubricant sealing structure according to the present invention, the oil-repellent surface is formed (surface texturing for enhancing oil repellency is implemented) on surface portions of the first and second members that regulate the gap portion extending from the interior of the device to a seal portion of the oil seal. The lubricant is repelled by the oil-repellent surface and deforms into a spheroidal shape, and the lubricant is prevented from flowing into the oil seal through the gap portion. It is possible to prevent adverse events in which large amounts of gear oil or another lubricant that has different characteristics than the seal-lip grease penetrate the seal portion of the oil seal, and in which the wear resistance and sealing properties of the seal portion deteriorate.

The oil film formation surface is formed on one or both of a lip distal-end surface of a seal lip of the oil seal and a sliding surface portion of the second member. Surface texturing composed of second fine grooves for enhancing an oil film formation effect (fluid dynamic pressure effect or oil film retention effect) is implemented on the oil film formation surface. It is possible to form and maintain a suitable oil film (oil film having high rigidity and required thickness) between the lip distal-end surface and the sliding surface portion of the second member, and to suppress wear of the seal portion. Thus, it is possible to maintain the required interference between the lip distal-end surface and the sliding surface of the second member, and to maintain the sealing properties produced by the oil seal.

Through the lubricant sealing structure according to the present invention, it is possible to enhance the seal effect produced by the oil seal and to maintain the sealing properties of the oil seal due to synergy between the oil-repellent surface and the oil film formation surface, which are formed by implementing surface texturing through machining of fine grooves. This makes it possible to reliably hinder lubricant from leaking out from a lubricant enclosure portion in the interior of the device to the exterior of the device.

A very small gap portion is formed in the gap portion so as to be located at a site further toward the interior of the device than the oil seal. In at least one of the first and second surface portions, the oil-repellent surface is formed on a surface portion extending from a position located further toward the interior of the device than the very small gap portion to the very small gap portion and on a surface portion forming the very small gap portion. The gap dimensions of the very small gap portion are set to values that are less than the diameter of the spheroidized lubricant formed on the oil-repellent surface. The spheroidal lubricant formed by the oil-repellent surface is hindered from penetrating toward the seal portion by the very small gap portion, which is narrower than the diameter of the spheroidal lubricant. Thus, it is possible to reliably prevent the lubricant from penetrating the seal portion.

An oil-repellent surface in which the first fine grooves are formed across the entire circumference can be used as the oil-repellent surface. An oil film formation surface in which the second fine grooves are formed across the entire circumference can be used as the oil film formation surface. Additionally, an oil film formation surface in which grooved surfaces where the second fine grooves are formed, and non-grooved surfaces having no second fine grooves formed therein, are formed in an alternating manner can be used as the oil film formation surface.

Each of the first fine grooves and the second fine grooves can be configured as at least one from among:

grooves extending in linear, curved, or wave-form shapes in a direction following the central axis of the device;

grooves extending in linear, curved, or wave-form shapes in a circumferential direction centered on the central axis;

grooves extending in linear, curved, or wave-form shapes in a direction that is inclined relative to the direction following the central axis;

grooves extending in a spiral; and grooves in a reticulate pattern.

MODE FOR CARRYING OUT THE INVENTION

Embodiments of a lubricant sealing structure to which the present invention is applied are described below with reference to the accompanying drawings. The embodiments described below illustrate cases where the lubricant sealing structure according to the present invention is applied to a strain wave gearing or to an actuator provided with a strain wave gearing and a motor. The present invention also can similarly be applied to gear-type reducers and other rotation-transmitting devices other than strain wave gearings.

Embodiment 1

Figure 1:
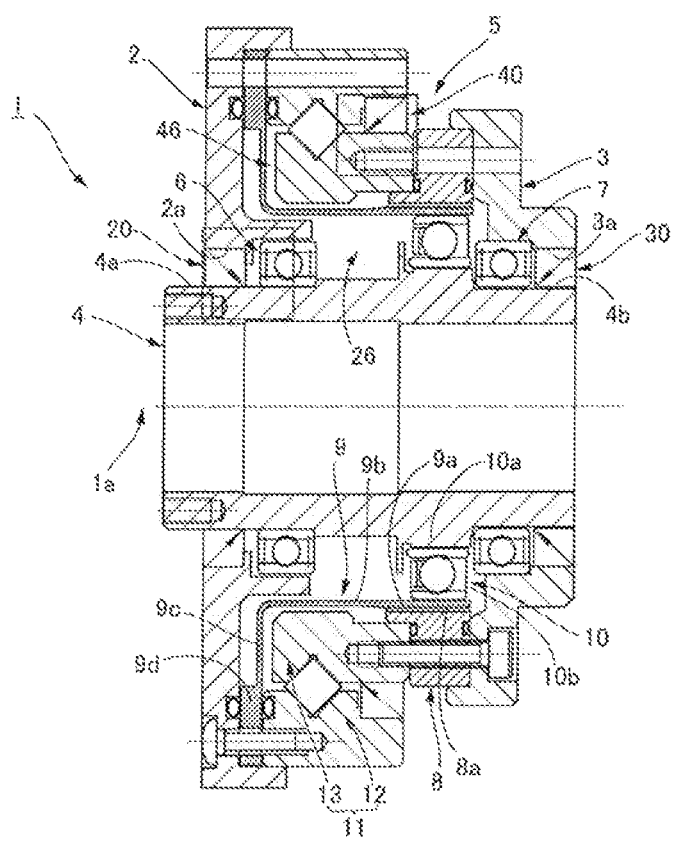
FIG. 1 is a schematic longitudinal cross-sectional view of a strain wave gearing provided with the lubricant sealing structure according to the present invention.

FIG. 1 is a schematic longitudinal cross-sectional view of a strain wave gearing according to embodiment 1 of the present invention. The strain wave gearing 1 is provided with: disc-form end plates 2 and 3 that face each other across a prescribed spacing in the direction of a central axis 1a; a hollow input shaft 4 that extends coaxially through central portions of the end plates 2, 3; and a wave gear mechanism 5 that is incorporated between the end plates 2, 3 in a state of coaxially surrounding the hollow input shaft 4. The hollow input shaft 4 is supported by the end plates 2, 3, with ball bearings 6, 7 interposed therebetween, in a state that allows rotation. The wave gear mechanism 5 is provided with an annular rigid internally toothed gear 8, a top-hat-shaped elastic externally toothed gear 9, an ellipsoidally contoured wave generator 10, and cross-roller bearing 11 that supports the internally toothed gear 8 and the externally toothed gear 9 in a state that allows relative rotation. A device housing is configured from the end plates 2, 3 and the cross-roller bearing 11.

The externally toothed gear 9 is provided with a flexible cylindrical barrel part 9b on which external teeth 9a are formed, a disc-form diaphragm 9c that spreads radially outward from the end of the cylindrical barrel part 9b, and an annular rigid boss 9d formed integrally with the outer peripheral edge portion of the diaphragm 9c. The opening-end-side portion of the cylindrical barrel part 9b where the external teeth 9a are formed is disposed coaxially inside the internally toothed gear 8. The wave generator 10 is coaxially fitted into the inner side of the opening-end-side portion of the cylindrical barrel part 9b. The wave generator 10 is provided with a plug part 10a formed integrally with the outer peripheral surface portion of the hollow input shaft 4, and a wave bearing 10b mounted on the ellipsoidal outer peripheral surface of the plug part 10a. The cylindrical barrel part 9b of the externally toothed gear 9 is flexed into an ellipsoidal shape by the wave generator 10, and portions of the external teeth 9a positioned at both long-axis ends of the ellipsoidal shape mesh with internal teeth 8a of the internally toothed gear 8.

The boss 9d of the externally toothed gear 9 is sandwiched between the end plate 2 and an outer race 12 of the cross-roller bearing 11 from both sides along the central-axis 1a direction, and these three members are securely fastened in this state. The internally toothed gear 8 is sandwiched between the end plate 3 and an inner race 13 of the cross-roller bearing 11 from both sides along the central-axis 1a direction, and these three members are securely fastened in this state.

The hollow input shaft 4 is a rotation-inputting member linked to a motor, etc. When the hollow input shaft 4 rotates, the wave generator 10 rotates integrally therewith, and the positions where the externally toothed gear 9 meshes with the internally toothed gear 8 move in the circumferential direction. The two gears 8, 9 undergo relative rotation that corresponds to the difference between the numbers of teeth of the two gears 8, 9. For example, the end plate 2 to which the externally toothed gear 9 is fastened is configured as a secured-side member, the end plate 3 to which the internally toothed gear 8 is fastened is configured as a rotation-outputting member, and relative rotation (reduced-speed rotation) is outputted from the end plate 3.

Examples of lubricated portions in the interior of the strain wave gearing 1 include the portions where the externally toothed gear 9 and the internally toothed gear 8 mesh, the portions where the externally toothed gear 9 and the wave generator 10 contact each other, sliding sections of the cross-roller bearing 11 and the wave bearing 10b of the wave generator 10, and sliding sections of the ball bearings 6, 7. Lubricant sealing structures for preventing a lubricant enclosed in or applied to these portions from leaking from the interior of the strain wave gearing 1 to the exterior are incorporated into the strain wave gearing 1. A lubricant sealing structure provided with an oil seal 20, a lubricant sealing structure provided with an oil seal 30, and a lubricant sealing structure provided with an oil seal 40 are incorporated into the strain wave gearing 1 according to the present example.

The lubricant sealing structure provided with the oil seal 20 creates a seal between an inner peripheral surface portion 2a of the end plate 2 and an outer peripheral surface portion 4a on one axial-end side of the hollow input shaft 4, and prevents a lubricant from leaking out from a lubricant enclosure portion 26 located between the hollow input shaft 4 and the externally toothed gear 9 between the end plates 2, 3. Similarly, the lubricant sealing structure provided with the oil seal 30 creates a seal between an inner peripheral surface 3a of the end plate 3 and an outer peripheral surface portion 4b on the other axial-end side of the hollow input shaft 4, and prevents a lubricant from leaking out from the lubricant enclosure portion 26. The lubricant sealing structure provided with the oil seal 40 creates a seal between the outer race 12 and the inner race 13 of the cross-roller bearing 11, and prevents a lubricant from leaking out from a lubricant enclosure portion 46 formed between the externally toothed gear 9, the cross-roller bearing 11, and the internally toothed gear.

(Lubricant Sealing Structure Between End Plate 2 and Hollow Input Shaft 4)

Figure 2:
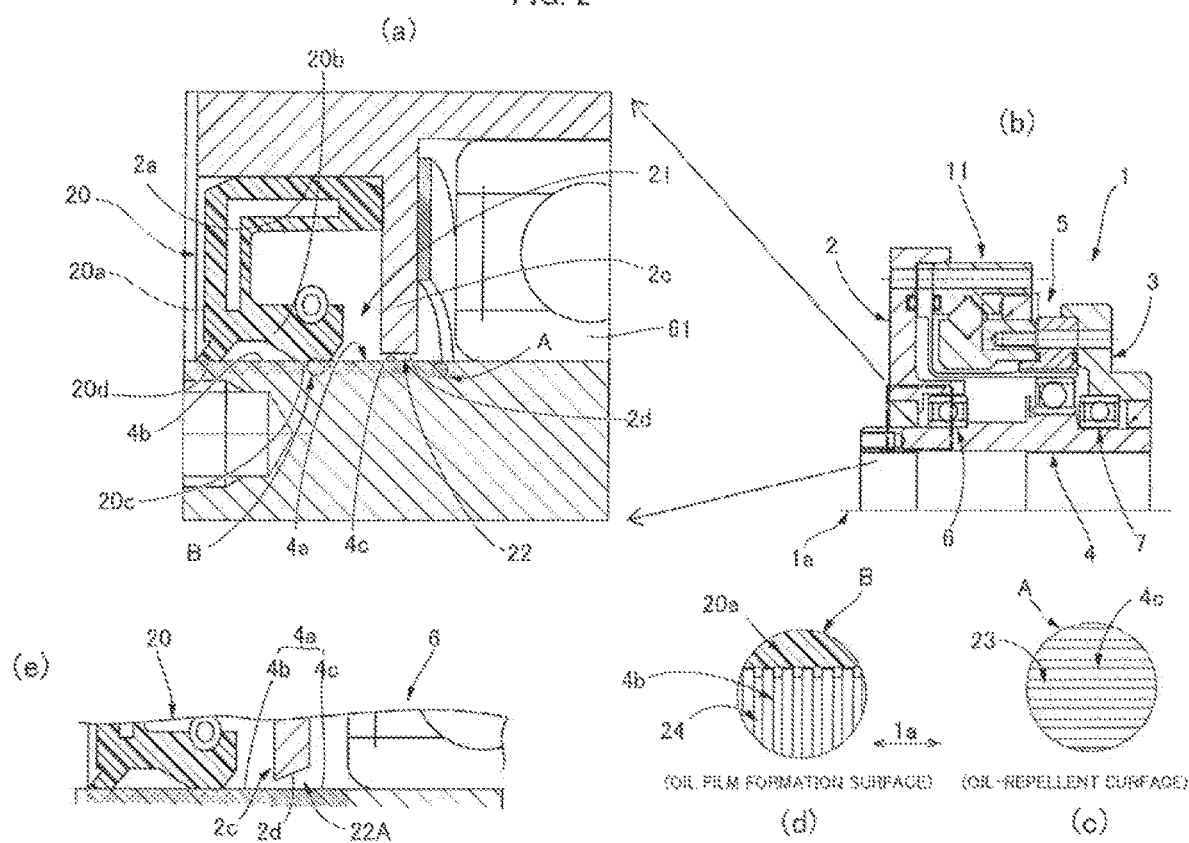
FIG. 2(a) is a partial expanded view showing, in expanded form, a site where the lubricant sealing structure is incorporated into the strain wave gearing shown in FIG. 1.
FIG. 2(b) is an illustrative diagram of the site in FIG. 2(a)
FIG. 2(c) is a schematic diagram of an oil-repellent surface.
FIG. 2(d) is a schematic diagram of an oil film formation surface.
FIG. 2(e) is an illustrative diagram of another example of a very small gap.

FIG. 2(a) is an illustrative diagram of the lubricant sealing structure provided with the oil seal 20 for sealing the space between the end plate 2 and the hollow input shaft 4, and FIG. 2(b) is a semi-cross-sectional view of the site where the lubricant sealing structure provided with the oil seal 20 is incorporated into the strain wave gearing 1. FIG. 2(c) is a schematic diagram showing an example of an oil-repellent surface, and FIG. 2(d) is a schematic diagram showing an example of an oil film formation surface.

One axial end section of the hollow input shaft 4 is rotatably supported in the end plate 2 via the ball bearing 6. The one axial end section of the hollow input shaft 4 protrudes toward the exterior of the device through a central portion of the end plate 2. A gap portion 21 that allows communication from the ball-bearing 6 side (lubricant-enclosure-portion 26 side) to the exterior of the device is formed between the inner peripheral surface portion 2a at the inner peripheral edge section of the end plate 2 and the outer peripheral surface portion 4a of the axial end section of the hollow input shaft 4, the outer peripheral surface portion 4a facing the inner peripheral surface portion 2a. The gap portion 21 is sealed by the oil seal 20. The oil seal 20 is provided with an annular seal element 20a composed of an elastic material, the seal element 20a being securely fitted into the inner peripheral surface portion 2a of the end plate 2, and lip distal-end surfaces 20c, 20d of seal lips 20b (main lip and auxiliary lip) of the seal element 20a being slidably pressed against the outer peripheral surface portion 4a of the hollow input shaft 4.

The outer peripheral surface portion 4a of the hollow input shaft 4 is provided with: an outer peripheral surface portion 4b for seal-element sliding, the lip distal-end surfaces 20c, 20d of the oil seal 20 sliding on the outer peripheral surface portion 4b; and an outer peripheral surface portion 4c extending from the outer peripheral surface portion 4b to a portion at which an inner race 61 of the ball bearing 6 is mounted. A partition plate portion 2c that protrudes radially inward between the oil seal 20 and the ball bearing 6 is formed on the inner peripheral surface portion 2a of the end plate 2. An inner peripheral end surface portion 2d of the partition plate portion 2c and the outer peripheral surface portion 4c of the hollow input shaft 4 face each other across a spacing narrower than that at other sites in the gap portion 21. This portion serves as a very small annular gap 22.

The outer peripheral surface portion 4c of the hollow input shaft 4 is an oil-repellent surface. In FIG. 2(a), the range over which the oil-repellent surface is formed is indicated by a fine dot pattern. The oil-repellent surface is provided with a surface texture in which first fine grooves 23 are formed in a prescribed pattern so as to achieve an oil-repelling effect with respect to lubricant leaking from the ball-bearing 6 side toward the very small gap 22. For example, the first fine grooves 23 extend in the central-axis 1a direction and are formed across the entire circumference of the outer peripheral surface portion 4c at fixed intervals, as shown in FIG. 2(c). The first fine grooves 23 are provided with a groove width and a groove depth ranging from several microns to several tens of nanometers, and are formed in the oil-repellent surface at intervals ranging from several microns to several tens of nanometers. The dimensions of the very small gap 22 formed in part of the gap portion 21 between the hollow input shaft 4 and the end plate 2 are set to values that are less than the diameter of the lubricant grains formed into spheroids on an oil-repellent surface. The oil-repellent surface may be formed on the inner peripheral end surface portion 2d of the end plate 2. In this case, the inner peripheral end surface portion 2d of the partition plate portion 2c of the end plate 2 for regulating the very small gap 22, and end surface portions on both sides connected to the inner peripheral end surface portion 2d, are to be configured as oil-repellent surfaces.

Next, in the outer peripheral surface portion 4a of the hollow input shaft 4, an oil film formation surface is formed on the outer peripheral surface portion 4b on which the lip distal-end surfaces 20c, 20d slide. Oil film formation surfaces may also be formed on the lip distal-end surfaces 20c, 20d of the oil seal 20. Each oil film formation surface is provided with a surface texture in which second fine grooves 24 are formed in a prescribed pattern so as to achieve an effect for forming an oil film of a seal-lip grease. For example, the second fine grooves 24 extend in the circumferential direction and are formed at fixed intervals in the central-axis 1a direction, as shown in FIG. 2(d). The second fine grooves 24 are provided with a groove width and a groove depth ranging from several microns to several tens of nanometers, and are formed in the oil film formation surface at intervals ranging from several microns to several tens of nanometers. The oil film formation surface can be formed across the entire circumference of the outer peripheral surface portion 4b of the hollow input shaft 4. The oil film formation surface may instead be formed in a partial region on the outer peripheral surface portion 4b. There may also be cases in which grooved surfaces where the second fine grooves 24 are formed, and non-grooved surfaces having no grooves formed therein, are formed in an alternating manner on the outer peripheral surface portion 4b toward the circumferential direction.

A variety of groove patterns can be employed as the groove patterns of the second fine grooves 24 and the first fine grooves 23 forming the oil-repellent surface. For example, it is possible to use a groove pattern in which first fine grooves 23 extending in linear, curved, or wave-form shapes in a direction following the central axis 1a are formed at fixed intervals in the circumferential direction. The first fine grooves 23 may form a groove pattern in which first fine grooves 23 extending in linear, curved, or wave-form shapes in a circumferential direction centered on the central axis 1a are formed at fixed intervals in the central-axis 1a direction. It is also possible to employ a groove pattern configured from first fine grooves extending in linear, curved, or wave-form shapes in a direction that is inclined relative to the direction following the central axis 1a. It is additionally possible to employ a groove pattern configured from first fine grooves 23 extending in a spiral at a fixed pitch in the central-axis 1a direction. Furthermore, it is also possible to employ a reticulate pattern in which first fine grooves extending in the central-axis 1a direction and first fine grooves extending in the circumferential direction intersect.

In the present example, a very small gap 22 having uniform gap dimensions is formed in the gap portion 21 that allows communication from the ball-bearing 6 side (lubricant-enclosure-portion 26 side) to the exterior of the device. It is also permissible for a very small gap 22A in which the gap dimensions gradually decrease from the lubricant-enclosure-portion 26 side toward the exterior of the device to be disposed in lieu of the very small gap 22, as shown in FIG. 2(e). For example, the inner peripheral end surface portion 2d of the partition plate portion 2c is to be configured as a tapered inner peripheral end surface portion. In this case, at least the minimum gap dimensions of the very small gap 22A are to be set to values that are less than the diameter of the lubricant grains formed into spheroids on an oil-repellent surface.

Figure 3:
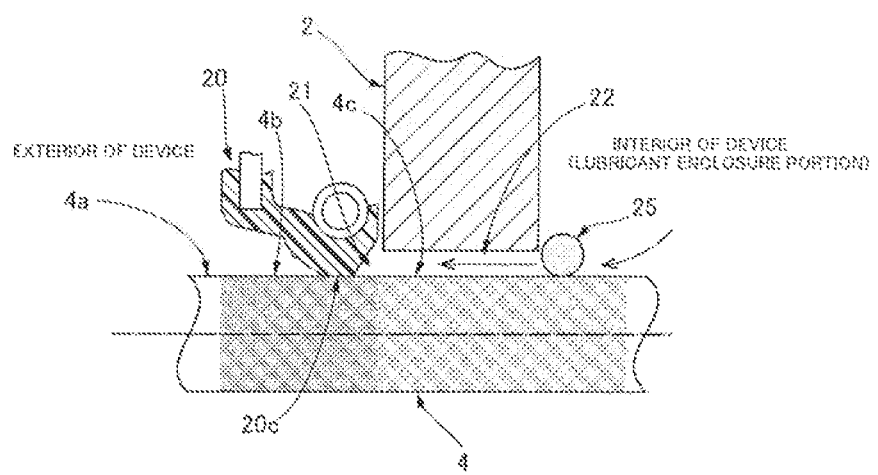
FIG. 3 is a schematic diagram illustrating the effect of the lubricant sealing structure.

FIG. 3 is a schematic diagram illustrating the effect of the lubricant sealing structure according to the present example. The lubricant flows out from the ball-bearing 6 side in the interior of the device toward the portion to be sealed using the oil seal 20 through the gap portion 21 between the hollow input shaft 4 and the end plate 2. The outer peripheral surface portion 4c of the hollow input shaft 4 is configured as an oil-repellent surface across the entire circumference thereof. The lubricant flowing out from the ball-bearing 6 side is repelled by the oil-repellent surface, and deforms into spheroidal grains just before penetrating the very small gap 22. Because the very small gap 22 is narrower than the diameter of the spheroidal lubricant grains 25 thus formed, the lubricant is hindered from flowing into the very small gap 22. It is possible to avoid a circumstance in which the lubricant reaches the seal portion (lip distal-end surface 20c of seal lip and outer peripheral surface portion 4b of hollow input shaft 4) of the oil seal 20 through the very small gap 22. This makes it possible to maintain the seal effect produced by the oil seal 20.

The oil film formation surface is formed across the entire circumference of the outer peripheral surface portion 4b of the hollow input shaft 4 on which the lip distal-end surface 20c of the oil seal 20 slides. The oil film formation surface is provided with a dynamic pressure generation effect by which a high-rigidity oil film of the lubricant (seal-lip grease) is formed between the lip distal-end surface 20c and the outer peripheral surface portion 4b of the hollow input shaft 4. Alternatively, the oil film formation surface is provided with an oil film retention effect that enables the lubricant (seal-lip grease) to be retained such that an oil film having the required thickness can be formed. Therefore, splitting of the oil film in the seal portion can be prevented, and any decline in sealing properties caused by wear of sliding portions can also be prevented. Additionally, because wear of the sliding portions is prevented, it is possible to maintain interference between the lip distal-end surface 20c and the outer peripheral surface portion 4b of the hollow input shaft 4.

The lubricant sealing structure provided with the oil seal 30 formed at the other axial end portion of the hollow input shaft 4 has the same structure as the lubricant sealing structure provided with the oil seal 20 described above, and is configured to be roughly symmetrical to said lubricant sealing structure.

(Lubricant Sealing Structure Between Outer Race 12 and Inner Race 13 of Cross-Roller Bearing 11)

The lubricant sealing structure provided with the oil seal 40 for sealing the space between the outer race 12 and the inner race 13 of the cross-roller bearing 11 is described next. FIG. 4(a) is an illustrative diagram of the lubricant sealing structure provided with the oil seal 40 for sealing the space between the outer race 12 and the inner race 13, and FIG. 4(b) is a semi-cross-sectional view of the site where the lubricant sealing structure provided with the oil seal 40 is incorporated into the strain wave gearing 1. FIG. 4(c) is a schematic diagram of an oil-repellent surface, and FIG. 4(d) is a schematic diagram of an oil film formation surface.

A gap portion 41 that allows communication from a raceway groove 14 to the exterior of the device is formed between an inner peripheral surface portion 12a of the outer race 12 and an outer peripheral surface portion 13a of the inner race 13, the outer peripheral surface portion 13a facing the inner peripheral surface portion 12a. The gap portion 41 is sealed by the oil seal 40. The oil seal 40 is provided with an annular seal element 40a composed of an elastic material, the seal element 40a being securely fitted into the inner peripheral surface portion 12a of the outer race 12, and lip distal-end surfaces 40c, 40d of seal lips 40b (main lip and auxiliary lip) of the seal element 40a being slidably pressed against the outer peripheral surface portion 13a of the inner race 13.

In the outer peripheral surface portion 13a of the inner race 13, a raceway-groove 14-side outer peripheral surface portion 13b is an oil-repellent surface and is provided with a surface texture in which first fine grooves 43 are formed in a prescribed pattern. In FIG. 4(a), the range over which the oil-repellent surface is formed is indicated by a fine dot pattern. An outer peripheral surface portion 13c on which the lip distal-end surfaces 40c, 40d of the oil seal 40 slide is an oil film retention surface and is provided with a surface texture in which second fine grooves 44 are formed in a prescribed pattern. In FIG. 4(a), the range over which the oil film formation surface is formed is indicated by a coarse dot pattern. An inner peripheral surface portion 12b that faces the outer peripheral surface portion 13b, which is the oil-repellent surface, across a very small spacing is formed on the inner peripheral surface portion 12a of the outer race 12. A very small gap 42 is formed between the inner peripheral surface portion 12b and the outer peripheral surface portion 13b. The inner peripheral surface portion 12b may also be configured as an oil-repellent surface in which first fine grooves are formed in a prescribed pattern across the entire circumference thereof.

For example, the first fine grooves 43 extend in the central-axis 1a direction and are formed across the entire circumference of the outer peripheral surface portion 13b at fixed intervals, as shown in FIG. 4(c). The first fine grooves 43 are provided with a groove width and a groove depth ranging from several microns to several tens of nanometers, and are formed in the oil-repellent surface at intervals ranging from several microns to several tens of nanometers.

Additionally, the second fine grooves 44 extend in the circumferential direction and are formed at fixed intervals in the central-axis 1a direction, as shown in FIG. 4(d). The second fine grooves 44 are provided with a groove width and a groove depth ranging from several microns to several tens of nanometers, and are formed in the oil film formation surface at intervals ranging from several microns to several tens of nanometers. The oil film formation surface can be formed across the entire circumference of the outer peripheral surface portion 13c of the inner race 13. The oil film formation surface may instead be formed in a partial region on the outer peripheral surface portion 13c. There may also be cases in which grooved surfaces where the second fine grooves 44 are formed, and non-grooved surfaces having no grooves formed therein, are formed in an alternating manner on the outer peripheral surface portion 13c toward the circumferential direction.

A very small gap 42 having uniform gap dimensions is formed in the gap portion 41 that allows communication from the raceway groove 14 to the exterior of the device. It is also permissible for a very small gap 42A in which the gap dimensions gradually decrease from the raceway-groove 14 side (lubricant-enclosure-portion side) toward the oil-seal 40 side (toward the exterior of the device) to be disposed in lieu of the very small gap 42, as shown in FIG. 4(e). For example, the inner peripheral surface portion 12b of the outer race 12 is to be configured as a tapered inner peripheral end surface portion. At least the minimum gap dimensions of the very small gap 42A are to be set to values that are less than the diameter of the lubricant grains formed into spheroids on an oil-repellent surface.

The lubricant flows out from the raceway-groove 14 side of the cross-roller bearings 11 in the interior of the device toward the portion to be sealed using the oil seal 40 through the gap portion 41 between the outer race 12 and the inner race 13. The lubricant flowing out from the cross-roller-bearing 11 side is repelled by the oil-repellent surface, and deforms into spheroidal grains just before penetrating the very small gap 42. Because the very small gap 42 is narrower than the diameter of the spheroidal lubricant grains thus formed, the lubricant is hindered from flowing into the very small gap 42. It is possible to avoid a circumstance in which the lubricant reaches the seal portion (sliding portions of lip distal-end surfaces 40c, 40d of seal lips and outer peripheral surface portion 13c of inner race 13) of the oil seal 40 through the very small gap 42. This makes it possible to maintain the seal effect produced by the oil seal 40.

The oil film formation surface is formed across the entire circumference of the outer peripheral surface portion 13c of the inner race 13 on which the lip distal-end surfaces 40c, 40d of the oil seal 40 slide. The oil film formation surface is provided with a dynamic pressure generation effect by which a high-rigidity oil film of the lubricant (seal-lip grease) is formed between the lip distal-end surfaces 40c, 40d and the outer peripheral surface portion 13c of the inner race 13. Alternatively, the oil film formation surface is provided with an oil film retention effect that enables the lubricant (seal-lip grease) to be retained such that an oil film having the required thickness can be formed. Therefore, splitting of the oil film in the seal portion can be prevented, and any decline in sealing properties caused by wear of the sliding portions can also be prevented.

Embodiment 2

Figure 5:
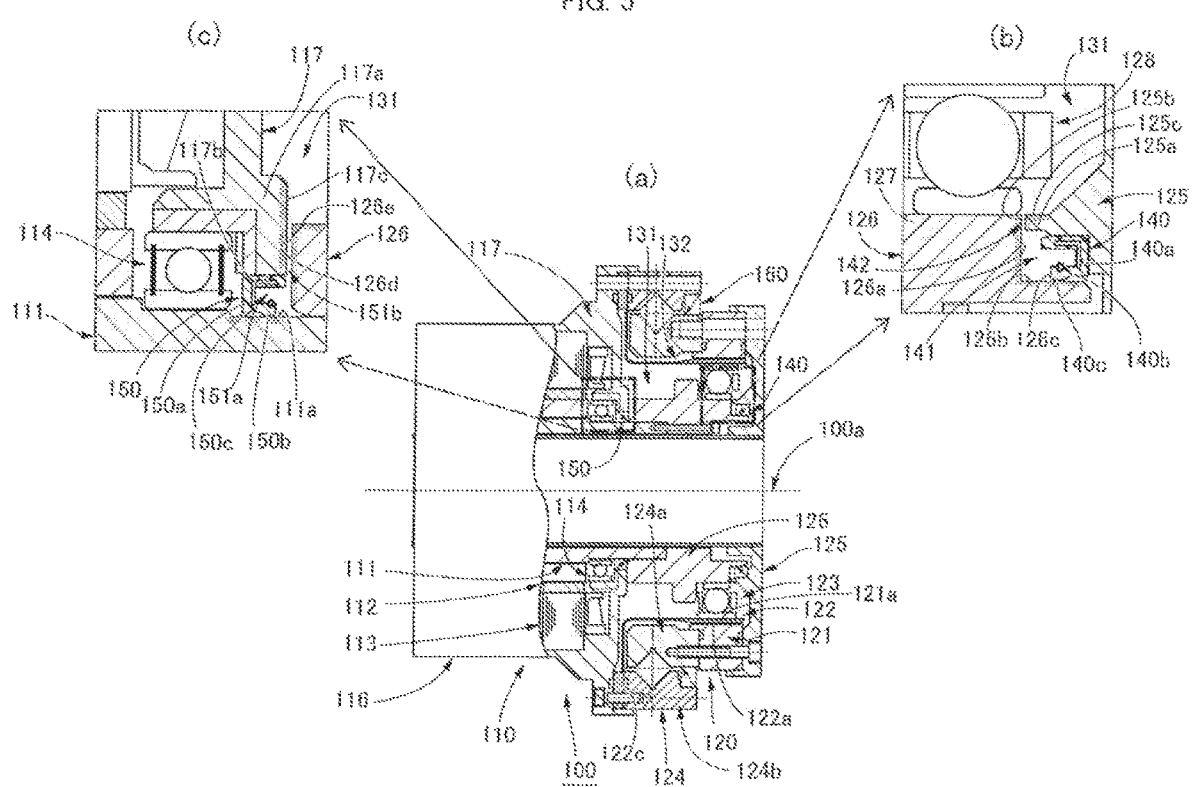
FIG. 5(a) is a schematic longitudinal cross-sectional view of an actuator provided with the lubricant sealing structure according to the present invention.
FIG. 5(b) is a partial expanded view of a site where the lubricant sealing structure is incorporated.
FIG. 5(c) is a partial expanded view of another site where the lubricant sealing structure is incorporated.

FIG. 5(a) is a schematic longitudinal cross-sectional view of an actuator provided with the lubricant sealing structure according to the present invention, FIG. 5(b) is a partial expanded view of a site where the lubricant sealing structure is incorporated, and FIG. 5 (c) is a partial expanded view of another site where the lubricant sealing structure is incorporated.

The actuator 100 is a hollow actuator provided with a hollow section extending through the center thereof, and is provided with a motor 110 and a strain wave gearing 120. The motor 110 is provided with a hollow motor shaft 111, a rotor 112 attached to the outer peripheral surface of the hollow motor shaft 111, and a stator 113 that coaxially surrounds the rotor 112. The hollow motor shaft 111 is rotatably supported, at both ends thereof, by a motor housing 116 with ball bearings interposed therebetween (only one ball bearing 114 is shown in the drawings).

The motor housing 116 is provided with a large-diameter attachment flange 117 at the front end thereof. The strain wave gearing 120 is coaxially attached to the front surface of the attachment flange 117. The strain wave gearing 120 is provided with a rigid internally toothed gear 121, a top-hat-shaped flexible externally toothed gear 122, a wave generator 123, cross-roller bearing 124 that supports the internally toothed gear 121 and the externally toothed gear 122 in a state that allows relative rotation, and a disc-form output shaft 125.

The wave generator 123 is provided with a hollow input shaft 126 that is coaxially linked to the hollow motor shaft 111, an ellipsoidally contoured plug 127 being formed integrally with the outer peripheral surface of the hollow input shaft 126. A wave bearing 128 is mounted on the ellipsoidal outer peripheral surface of the plug 127. A cylindrical barrel part of the externally toothed gear 122, on which external teeth 122a are formed, is flexed into an ellipsoidal shape by the wave generator 123, and the external teeth partially mesh with internal teeth 121a of the internally toothed gear 121.

An annular boss 122c of the externally toothed gear 122 is sandwiched between the attachment flange 117 and an outer race 124b of the cross-roller bearing 124, and these three members are securely fastened in this state. The internally toothed gear 121 is sandwiched between an inner race 124a of the cross-roller bearing 124 and the output shaft 125, and these three members are securely fastened in this state. Output rotation of the motor 110 is inputted from the hollow motor shaft 111 to the wave generator 123. When the wave generator 123 rotates, the internally toothed gear 121 rotates at a reduced speed, and reduced-speed rotation is outputted from the output shaft 125 linked to the internally toothed gear 121 to a load side (not shown).

Examples of lubricated portions in the interior of the strain wave gearing 120 include the portions where the externally toothed gear 122 and the internally toothed gear 121 mesh, the portions where the externally toothed gear 122 and the wave generator 123 contact each other, and the cross-roller bearing 124 and the wave bearing 128 of the wave generator 123. A lubricant sealing structure provided with an oil seal 140, a lubricant sealing structure provided with an oil seal 150, and a lubricant sealing structure provided with an oil seal 160 are incorporated into the strain wave gearing 120 in order to prevent a lubricant from leaking from lubricant enclosure portions 131, 132 in the interior of the strain wave gearing 120 to the exterior of the device or toward the motor 110.

(Lubricant Sealing Structure Between Hollow Input Shaft 126 and Output Shaft 125)

In the strain wave gearing 120, the space between the hollow input shaft 126, which rotates at high speed, and the output shaft 125, which rotates at a reduced speed, is sealed by the lubricant sealing structure provided with the oil seal 140, as shown in FIG. 5(b). An internal space in the externally toothed gear 122 in which the wave bearing 128 is disposed is a lubricant enclosure portion 131 in which is enclosed a lubricant supplied, inter alia, to the wave bearing 128 or to sliding portions between the wave bearing 128 and the externally toothed gear 122. A gap portion 141 that passes through from the wave bearing 128 positioned toward the interior of the device to the exterior of the device is formed between the hollow input shaft 126 and the output shaft 125. The exterior-side end of the gap portion 141 is sealed by the oil seal 140.

An end surface portion 126a and an outer peripheral surface portion 126b are formed at the end portions of the hollow input shaft 126. A protruding portion 125a that protrudes toward the end surface portion 126a is formed on the inner-peripheral-edge-side portion of the output shaft 125. The oil seal 140 is mounted between the protruding portion 125a and the outer peripheral surface portion 126b of the hollow input shaft 126. A seal element 140a of the oil seal 140 is securely fitted into the inner peripheral surface portion of the protruding portion 125a of the output shaft 125. A lip distal-end surface 140c of a seal lip 140b of the seal element 140a is slidably pressed against the outer peripheral surface portion 126b of the hollow input shaft 126.

A distal-end surface 125b of the protruding portion 125a of the output shaft 125 faces the end surface portion 126a of the hollow input shaft 126 across a very small spacing from a central-axis 100a direction. A very small gap portion 142 is formed between the distal-end surface 125b and the end surface portion 126a. The gap dimensions of the very small gap portion 142 are fixed, but may instead be configured so as to gradually decrease from the wave-bearing 128 side toward the oil-seal 140 side.

The entire end surface portion 126a of the hollow input shaft 126, and a portion extending partway along the outer peripheral surface portion 126b, are oil-repellent surfaces in which first fine grooves are formed. A portion of the outer peripheral surface portion 126b on which the lip distal-end surface 140c of the seal lip 140b of the oil seal 140 slides is an oil film formation surface in which second fine grooves are formed. Additionally, a distal-end surface 125b of the protruding portion 125a of the output shaft 125, and a fixed-width outer peripheral surface portion 125c connected to the distal-end surface 125b, are oil-repellent surfaces in which first fine grooves are formed.

The oil-repellent surfaces are provided with surface textures in which the first fine grooves are formed in a prescribed pattern so as to achieve an oil-repelling effect with respect to the lubricant enclosed in the lubricant enclosure portion 131. The first fine grooves are provided with a groove width and a groove depth ranging from several microns to several tens of nanometers, and are formed in the oil-repellent surfaces at intervals ranging from several microns to several tens of nanometers. The gap dimensions of the very small gap portion are set to values that are less than the diameter of the spheroidized lubricant formed on an oil-repellent surface.

The oil film formation surface is provided with a surface texture in which second fine grooves are formed in a prescribed pattern so as to achieve an oil film formation effect. The second fine grooves are provided with a groove width and a groove depth ranging from several microns to several tens of nanometers, and are formed in the oil film formation surface at intervals ranging from several microns to several tens of nanometers. In FIG. 5(b), the range over which the oil-repellent surfaces and the oil film formation surface are formed is indicated by a dot pattern.

The lubricant flows out from the wave-bearing 128 side in the interior toward the portion to be sealed using the oil seal 140 through the gap portion 141 between the hollow input shaft 126 and the output shaft 125. The lubricant is repelled by the outer peripheral surface portion 125c, which is the oil-repellent surface, and deforms into spheroidal grains just before penetrating the very small gap portion 142. The very small gap portion 142 is narrower than the diameter of the spheroidal lubricant grains thus formed, and is regulated by the oil-repellent surface. Thus, the lubricant is hindered from flowing into the very small gap portion, and it is possible to avoid a circumstance in which the lubricant reaches the seal portion (sliding portions of lip distal-end surface 140c of seal lip and outer peripheral surface portion 126c of hollow input shaft 126) of the oil seal 140. This makes it possible to maintain the seal effect produced by the oil seal 140.

Additionally, an oil film formation surface is formed across the entire circumference at a site on the outer peripheral surface portion 126c of the hollow input shaft 126 on which the lip distal-end surface 140c of the oil seal 140 slides. The oil film formation surface is provided with a dynamic pressure generation effect by which a high-rigidity oil film of the lubricant (seal-lip grease) is formed between the lip distal-end surface 140c and the outer peripheral surface portion 126*c*. Alternatively, the oil film formation surface is provided with an oil film retention effect that enables the lubricant (seal-lip grease) to be retained such that an oil film having the required thickness can be formed. Therefore, splitting of the oil film in the seal portion can be prevented, and any decline in sealing properties caused by wear of the seal lip 140*b* of the seal element 140*a*, which is a sliding member, can also be prevented.

(Lubricant Sealing Structure Between Strain Wave Gearing 120 and Motor 110)

The lubricant sealing structure provided with the oil seal 150 shown in FIG. 5(*c*) prevents the lubricant from leaking from the strain-wave-gearing 120 side toward the motor 110. The ball bearing 114 is mounted between an inner peripheral edge section 117*a* of the attachment flange 117, which is a securing member, and the axial end portion of the hollow motor shaft 111, the axial end portion facing the inner peripheral edge section 117*a*. The distal end of the axial end portion of the hollow motor shaft 111 protrudes from the portion where the ball bearing 114 is mounted toward the strain wave gearing 120 by passing through the attachment flange 117.

A gap portion 151*a* that allows communication with the strain-wave-gearing 120 side is formed between an outer peripheral surface portion 111*a* of the axial end section of the hollow motor shaft 111 and an inner peripheral surface portion 117*b* of an inner peripheral edge section of the attachment flange 117. A very small gap portion 151*b* that allows communication with the gap portion 151*a* is formed between a strain-wave-gearing 120-side end surface portion 117*c* of the inner peripheral edge section of the attachment flange 117 and an end surface portion 126*d* of the hollow input shaft 126 of the strain wave gearing 120. The lubricant inclusion portion 131 in the interior of the strain wave gearing 120 and the interior of the motor 110 communicate via the very small gap portion 151*b* and the gap portion 151*a*. The gap dimensions of the very small gap portion 151*b* are fixed, but may instead be configured so as to gradually decrease from the motor 110 side toward the strain-wave-gearing 120 side.

The gap portion 151*a* is sealed by the oil seal 150. A seal element 150*a* of the oil seal 150 is securely fitted into the inner peripheral surface portion 117*b* of the attachment flange 117. Lip distal-end surfaces 150*b*, 150*c* of the seal element 150*a* are slidably pressed against the outer peripheral surface portion 111*a* of the hollow motor shaft 111.

The end surface portion 117*c* of the attachment flange 117 is an oil-repellent surface in which first fine grooves are formed. The end surface portion 126*d* of the hollow input shaft 126, which faces the end surface portion 117*c*, is also an oil-repellent surface in which first fine grooves are formed. Furthermore, a fixed-width outer peripheral surface portion 126*e* connected to the end surface portion 126*d* of the hollow input shaft 126 is also an oil-repellent surface in which first fine grooves are formed. The outer peripheral surface portion 111*a* of the hollow motor shaft 111 on which the lip distal-end surfaces 150*b*, 150*c* of the oil seal 150 slide is an oil film formation surface in which second fine grooves are formed.

The oil-repellent surfaces are provided with a surface texture in which the first fine grooves are formed in a prescribed pattern so as to achieve oil repellency with respect to the lubricant enclosed in the lubricant enclosure portion 131. The first fine grooves are provided with a groove width and a groove depth ranging from several microns to several tens of nanometers, and are formed in the oil-repellent surfaces at intervals ranging from several microns to several tens of nanometers. Additionally, the gap dimensions of the very small gap portion are set to values that are less than the diameter of the spheroidized lubricant formed on an oil-repellent surface.

The oil film formation surface is provided with a surface texture in which the second fine grooves are formed in a prescribed pattern so as to achieve an oil film formation effect. The second fine grooves are provided with a groove width and a groove depth ranging from several microns to several tens of nanometers, and are formed in the oil film formation surface at intervals ranging from several microns to several tens of nanometers. In FIG. 5(*c*) as well, the range over which the oil-repellent surfaces and the oil film formation surface are formed is indicated by a dot pattern.

The lubricant flows out from the interior of the strain wave gearing 120 toward the motor 110 through the very small gap portion 151*b* and the gap portion 151*a*. The gap portion 151*a* is sealed by the oil seal 150. The lubricant is repelled by the outer peripheral surface portion 126*e*, the end surface portion 126*d*, and the end surface portion 117*c*, which are the oil-repellent surfaces, and deforms into spheroidal grains just before penetrating the very small gap portion 151*b*. Because the very small gap portion 151*b* is narrower than the diameter of the spheroidal lubricant grains thus formed, the lubricant is hindered from flowing into the very small gap portion 151*b*. It is possible to prevent a circumstance in which the lubricant reaches the seal portion (sliding portions of lip distal-end surfaces 150*b*, 150*c* of oil seal 150 and outer peripheral surface portion 111*a* of hollow motor shaft 111) of the oil seal 150. This makes it possible to maintain the seal effect produced by the oil seal 150.

Additionally, the oil film formation surface is formed across the entire circumference at a site on the outer peripheral surface portion 111*a* of the hollow motor shaft 111 on which the lip distal-end surfaces 150*b*, 150*c* of the oil seal 150 slide. The oil film formation surface is provided with a dynamic pressure generation effect by which a high-rigidity oil film of the lubricant (seal-lip grease) is formed between the lip distal-end surfaces 150*b*, 150*c* and the outer peripheral surface portion 111*a*. Alternatively, the oil film formation surface is provided with an oil film retention effect that enables the lubricant (seal-lip grease) to be retained such that an oil film having the required thickness can be formed. Therefore, splitting of the oil film in the seal portion can be prevented, and any decline in sealing properties caused by wear of the seal lip of the seal element 150*a*, which is a sliding member, can also be prevented. Additionally, interference between the lip distal-end surfaces 150*b*, 150*c* and the outer peripheral surface portion 111*a* of the hollow motor shaft 111 is maintained.

Figure 4:
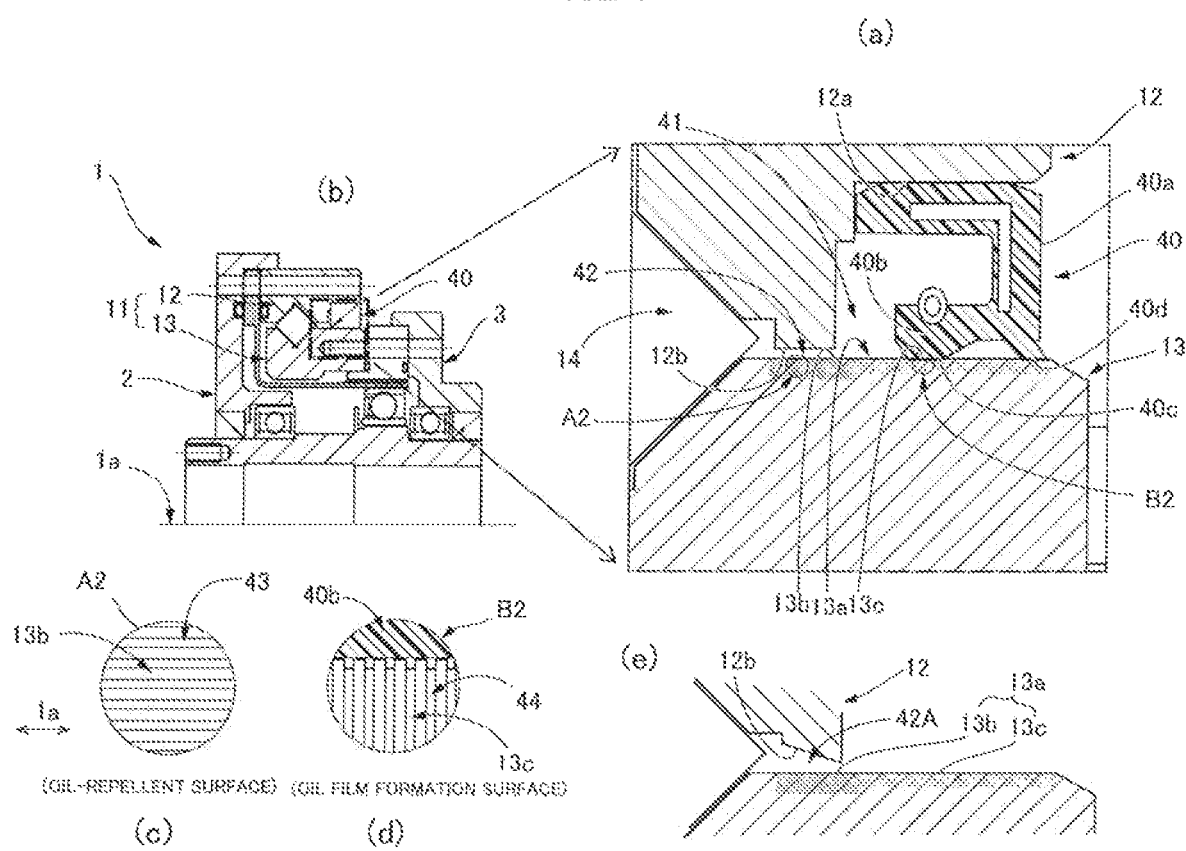
FIG. 4(a) is a partial expanded view showing, in expanded form, another site in the strain wave gearing where a lubricant sealing structure is incorporated.
FIG. 4(b) is an illustrative diagram of the site in FIG. 4(a)
FIG. 4(c) is a schematic diagram of an oil-repellent surface.
FIG. 4(d) is a schematic diagram of an oil film formation surface.
FIG. 4(e) is an illustrative diagram of another example of a very small gap.

The lubricant sealing structure produced by the oil seal 160 in the strain wave gearing 120 is disposed at a portion of the cross-roller bearing 124 that supports the externally toothed gear 122 and the internally toothed gear 121 in a state that allows relative rotation. Specifically, the lubricant sealing structure is disposed in order to seal a gap portion between the inner race 124*a* and the outer race 124*b* of the cross-roller bearings 124. This lubricant sealing structure is substantially identical to the lubricant sealing structure in which the oil seal 40 is used, which is shown in FIG. 4 within embodiment 1. Therefore, no specific description thereof is given here.

The invention claimed is:

1. A lubricant sealing structure that prevents a lubricant from leaking out, from an interior of a device provided with a first member and a second member that rotate relative to one another about a central axis, through a gap portion between the first and second members, the lubricant sealing structure comprising:
- a first surface portion of the first member and a second surface portion of the second member, between which the gap portion is formed;
- an oil seal that is secured to the first surface portion and that seals the gap portion while slidably being in contact with the second surface portion;
- an oil-repellent surface that is formed on at least one of the first surface portion and the second surface portion, and that is positioned at a side of the interior of the device with respect to the oil seal and is apart from the oil seal so as not to come into contact therewith; and
- an oil film formation surface formed on at least one of a distal-end surface portion of the oil seal that comes into contact with the second surface portion and a site on the second surface portion with which the distal-end surface portion comes into contact,
- the oil-repellent surface being provided with a surface texture in which first fine grooves having a groove width and a groove depth are formed at prescribed intervals so as to achieve an oil-repelling effect with respect to the lubricant,
- the oil film formation surface being provided with a surface texture in which second fine grooves having a groove width depth are formed at prescribed intervals so as to achieve an oil film formation effect, wherein
- the gap portion has a first gap portion and a second gap portion, the second gap portion being narrower than the first gap portion;
- the second gap portion is located at a side of the interior of the device with respect to the first gap portion in which the oil seal is accommodated;
- in at least one of the first and second surface portions, the oil-repellent surface is formed on a surface portion extending from a position located at a site further toward the interior of the device than the second gap portion to the second gap portion and is formed on a surface portion forming the second gap portion; and wherein
- the first fine grooves extend in a circumferential direction centered on the central axis, and
- the second fine grooves extend in a direction along the central axis.

2. The lubricant sealing structure according to claim 1, wherein
- the oil-repellent surface is a surface in which the first fine grooves are formed entirely on a circumference thereon; and wherein
- the oil film formation surface is:
- a surface in which the second fine grooves are formed entirely or partially on a circumference thereon; or
- a surface in which a grooved surface portion where the second fine grooves are formed and a non-grooved surface portion where the second fine grooves are not formed, are formed in an alternating manner.

3. A strain wave gearing, comprising:
- an input shaft;
- a wave gear mechanism that reduces in speed of rotation of the input shaft and output reduced-speed rotation;
- a device housing to support the input shaft in a rotatable state via a bearing;
- a lubricant sealing structure that prevents a lubricant from leaking out, from an interior to an exterior of the gearing, through a gap portion formed between an inner peripheral surface potion of the device housing and an outer peripheral surface portion of the input shaft;
- an oil seal that is secured to the inner peripheral surface portion of the device housing and that seals the gap portion while slidably being in contact with the outer peripheral surface potion of the input shaft;
- an oil-repellent surface that is formed on at least one of the inner peripheral surface portion and the outer peripheral surface portion, and that is positioned at a side of the interior with respect to the oil seal and is apart from the oil seal so as not to come into contact therewith; and
- an oil film formation surface formed on at least one of a distal-end surface portion of the oil seal that comes into contact with the outer peripheral surface portion and a site on the outer peripheral surface portion with which the distal-end surface portion comes into contact,
- the oil-repellent surface being provided with a surface texture in which first fine grooves having a groove width and a groove depth are formed at prescribed intervals so as to achieve an oil-repelling effect with respect to the lubricant,
- the oil film formation surface being provided with a surface texture in which second fine grooves having a groove width and a groove depth are formed at prescribed intervals so as to achieve an oil film formation effect, wherein
- the gap portion has a first gap portion and a second gap portion, the second gap portion being narrower than the first gap portion;
- the second gap portion is located at a side of the interior with respect to the first gap portion in which the oil seal is accommodated;
- in at least one of the inner peripheral surface portion and the outer peripheral surface portion, the oil-repellant surface is formed on a section extending from a position located at a side further toward the interior than the second gap portion to the second gap portion and is formed on a section forming second gap portion; and wherein
- the first fine grooves extend in a circumferential direction centered on a central axis of the gearing: and
- the second fine grooves extend in a direction along the central axis.

4. A strain wave gearing, comprising:
- a roller bearing that supports a rigid internally toothed gear and a flexible externally toothed gear in a relatively rotatable state;
- a lubricant sealing structure that prevents a lubricant from leaking out to an exterior of the gearing, through a gap portion formed between an inner peripheral surface potion of an outer race and an outer peripheral surface portion of an inner race of the roller bearing;
- an oil seal that is secured to the inner peripheral surface portion of the outer race and that seals the gap portion while slidably being in contact with the outer peripheral surface potion of the inner race;
- an oil-repellent surface that is formed on at least one of the inner peripheral surface portion and the outer peripheral surface portion, and that is positioned between a roller raceway groove of the roller bearing and the oil seal and is apart from the oil seal so as not to come into contact therewith; and
- an oil film formation surface formed on at least one of a distal-end surface portion of the oil seal that comes into contact with the outer peripheral surface portion and a site on the outer peripheral surface portion with which the distal-end surface portion comes into contact, the oil-repellent surface being provided with a surface texture in which first fine grooves having a groove width and a groove depth are formed at prescribed intervals so as to achieve an oil-repelling effect with respect to the lubricant, and the oil film formation surface being provided with a surface texture in which second fine grooves having a groove width and a groove depth are formed at prescribed intervals so as to achieve an oil film formation effect, and wherein the gap portion has a first gap portion and second gap portion, the second gap portion being narrower than the first gap portion;

the second gap portion is located between the roller raceway groove and the first gap portion in which the oil seal is accommodated;

in at least one of the inner peripheral surface portion and the outer peripheral surface portion, the oil-repellent surface is formed on a section extending from a position located further toward the roller raceway groove than the second portion to the second gap portion and is formed on a section forming the second gap portion; and wherein the first fine grooves extend in a circumferential direction centered on a central axis of the gearing; and the second fine grooves extend in a direction along the central axis.

5. A strain wave gearing provided with an input shaft; a wave gear mechanism that reduces rotation of the input shaft; and an output shaft that outputs reduced-speed rotation; the strain wave gearing comprising:

a lubricant sealing structure that prevents a lubricant from leaking out, from an interior of the strain wave gearing to an exterior of the gearing, through a gap portion formed between a first surface portion of the output shaft and a second surface portion of the input shaft, the second surface portion facing the first surface portion;

an oil seal that is secured to the first surface portion and that seals the gap portion while slidably being in contact with the second surface potion;

an oil-repellent surface that is formed on at least one of the first surface portion and the second surface portion, and that is positioned further toward the interior than is the oil seal so as not to come into contact therewith; and an oil film formation surface formed on at least one of a distal-end surface portion of the oil seal that comes into contact with the second surface portion and a site on the second surface portion with which the distal-end surface portion comes into contact, the oil-repellent surface being provided with a surface texture in which first fine grooves having a groove width and a groove depth are formed at prescribed intervals so as to achieve an oil-repelling effect with respect to the lubricant, and the oil film formation surface being provided with a surface texture in which second fine grooves having a groove width and a groove depth are formed at prescribed intervals so as to achieve an oil film formation effect, wherein the gap portion has a first gap portion and a second gap portion, the second gap portion being narrower than the first gap portion;

the second gap portion is located at a site further toward the interior than the first gap portion in which the oil seal is accommodated;

in at least one of the first and second surface portions, the oil-repellent surface is formed on a section extending from a position located further toward the interior than the second gap portion to the second gap portion and is formed on a section forming the second gap portion; and wherein the first fine grooves extend in a circumferential direction centered on a central axis of the gearing; and the second fine grooves extend in a direction along the central axis.

6. An actuator, comprising:

a motor;

a strain wave gearing that is coaxially attached to a mounting flange provided on a front end of the motor;

a motor shaft that penetrates through the mounting flange and extends into an interior of the strain wave gearing;

an input shaft that is coaxially linked with a distal-end portion of the motor shaft inside the strain wave gearing;

a lubricant sealing structure that prevents a lubricant from leaking out, from the strain wave gearing to an interior of the gearing, through a gap portion formed between a first surface portion of an inner peripheral edge part of the mounting flange and portions where the first surface portion faces, the portions including a motor shaft and a second surface portion of the input shaft;

an oil seal that is secured to the first surface portion and that seals the gap portion while slidably being in contact with the second surface potion;

an oil-repellent surface that is formed on at least one of the first surface portion and the second surface portion, and that is positioned further toward the strain wave gearing than is the oil seal so as not to come into contact with the oil seal; and an oil film formation surface formed on at least one of a distal-end surface portion of the oil seal that comes into contact with the second surface portion and a site on the second surface portion with which the distal-end surface portion comes into contact, the oil-repellent surface being provided with a surface texture in which first fine grooves having a groove width and a groove depth are formed at prescribed intervals so as to achieve an oil-repelling effect with respect to the lubricant, and the oil film formation surface being provided with a surface texture in which second fine grooves having a groove width and a groove depth are formed at prescribed intervals so as to achieve an oil film formation effect, wherein the gap portion has a first gap portion and a second gap portion, the second gap portion being narrower than the first gap portion;

the second gap portion is located at a site further toward the strain wave gearing than the first gap portion in which the oil seal is accommodated;

in at least one of the first and second surface portions, the oil-repellent surface is formed on a section extending from a position located further toward the strain wave gearing than the second gap portion to the second gap portion and is formed on a section forming the second gap portion; and wherein the first fine grooves extend in a circumferential direction centered on a central axis of the actuator; and the second fine grooves extend in a direction along the central axis.

* * * * *